US012777077B2

(12) United States Patent
Padiyar et al.

(10) Patent No.: US 12,777,077 B2
(45) Date of Patent: Oct. 27, 2026

(54) SYSTEMS AND METHODS FOR DYNAMICALLY GENERATING TRUSTED NETWORKS FOR ELECTRONIC DEVICES

(71) Applicant: BANK OF AMERICA CORPORATION, Charlotte, NC (US)

(72) Inventors: Sneha Padiyar, Mumbai (IN); Maneesh Kumar Sethia, Hyderabad (IN); Hariharan Balakrishnan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 158 days.

(21) Appl. No.: 18/760,448

(22) Filed: Jul. 1, 2024

(65) Prior Publication Data

US 2026/0006078 A1 Jan. 1, 2026

(51) Int. Cl.
*H04L 9/40* (2022.01)

(52) U.S. Cl.
CPC .................................... *H04L 63/20* (2013.01)

(58) Field of Classification Search
CPC ....................................................... H04L 63/20
See application file for complete search history.

(56) References Cited

U.S. PATENT DOCUMENTS

2023/0004970 A1* 1/2023 Jakobsson ............ G06Q 20/407
2023/0186309 A1* 6/2023 Kurian ............... G06Q 20/3674 705/44
2025/0293879 A1* 9/2025 Gilchrist ................... H04L 9/32

* cited by examiner

*Primary Examiner* — Noura Zoubair
(74) *Attorney, Agent, or Firm* — Moore & Van Allen PLLC; Lauren M. Stokes

(57) ABSTRACT

Systems, computer program products, and methods are described herein for dynamically generating trusted networks for electronic devices. The present invention is configured to identify a data transmission attempt from a primary user device; analyze, by a generative artificial intelligent (AI) scanner and prior to allowing the data transmission attempt, the primary user device; determine, by the generative AI scanner, at least one altered property is present on the primary user device; generate, based on the determination that the at least one altered property is on the primary user device, a root break alert interface component including a program identifier of the at least one altered property; and transmit the root break alert interface component to the user device.

16 Claims, 7 Drawing Sheets

SYSTEMS AND METHODS FOR DYNAMICALLY GENERATING TRUSTED NETWORKS FOR ELECTRONIC DEVICES

FIELD OF THE INVENTION

The present invention embraces a system for dynamically generating trusted networks for electronic devices.

BACKGROUND

Issues often arise in electronic user devices when applications and programs are installed which are unsupported by the manufacturer of these devices. The user devices that have these installed unsupported applications and programs are often referred to as jailbroken devices or root broken devices and can cause multiple issues with the jailbroken devices. Such issues are shown when manufacturer-supported applications cannot function properly as the unsupported programs interrupt the normal functioning of these user devices. Further issues arise when secure data is attempted to be transmitted from these jailbroken devices and the data transmission cannot be completed, which may leave the secure data transmission open for data compromise, data loss, and other such data misappropriation. Thus, there exists a need for a system that can automatically, dynamically, and securely generate trusted networks for electronic devices by generating trusted networks between the jailbroken devices and trusted secondary devices that may act as a proxy for the data transmission.

Applicant has identified a number of deficiencies and problems associated with building trusted networks between user devices dynamically and automatically. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamically generating trusted networks for electronic devices is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify a data transmission attempt from a primary user device; analyze, by a generative artificial intelligent (AI) scanner and prior to allowing the data transmission attempt, the primary user device; determine, by the generative AI scanner, at least one altered property is present on the primary user device; generate, based on the determination at least one altered property is on the primary user device, a root break alert interface component comprising a program identifier of the at least one altered property; and transmit the root break alert interface component to the user device.

In some embodiments, the computer-readable code is further configured to cause the at least one processing device to: trigger a configuration of a graphical user interface of the user device based on the root break alert interface component.

In some embodiments, the computer-readable code is further configured to cause the at least one processing device to: generate, by a generative AI based smart contract, a trusted network between the primary user device and at least one secondary user device, wherein the at least one secondary user device is identified based on an association with the primary user device. In some embodiments, the computer-readable code is further configured to cause the at least one processing device to: automatically, from the primary user device to the secondary user device, transmit the data transmission attempt; and automatically, from the at least one secondary user device, transmit the data transmission attempt to an intended recipient device. In some embodiments, the data transmission attempt transmitted from the primary user device is a Non-Fungible Token (NFT). In some embodiments, the data transmission attempt transmitted from the at least one secondary user device to the intended recipient device is a Non-Fungible Token (NFT).

In some embodiments, the association between the at least one secondary user device and the primary user device comprises a near field geofence between the primary user device and the at least one secondary user device. In some embodiments, the near field geofence is based on at least one of short-range wireless communication, a Near Field Communication (NFC), or Radio Frequency Identification (RFID).

In some embodiments, the association between the at least one secondary user device and the primary user device comprises a pre-selection by a user account associated with the primary user device of an at least one secondary account associated with the at least one secondary user device.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
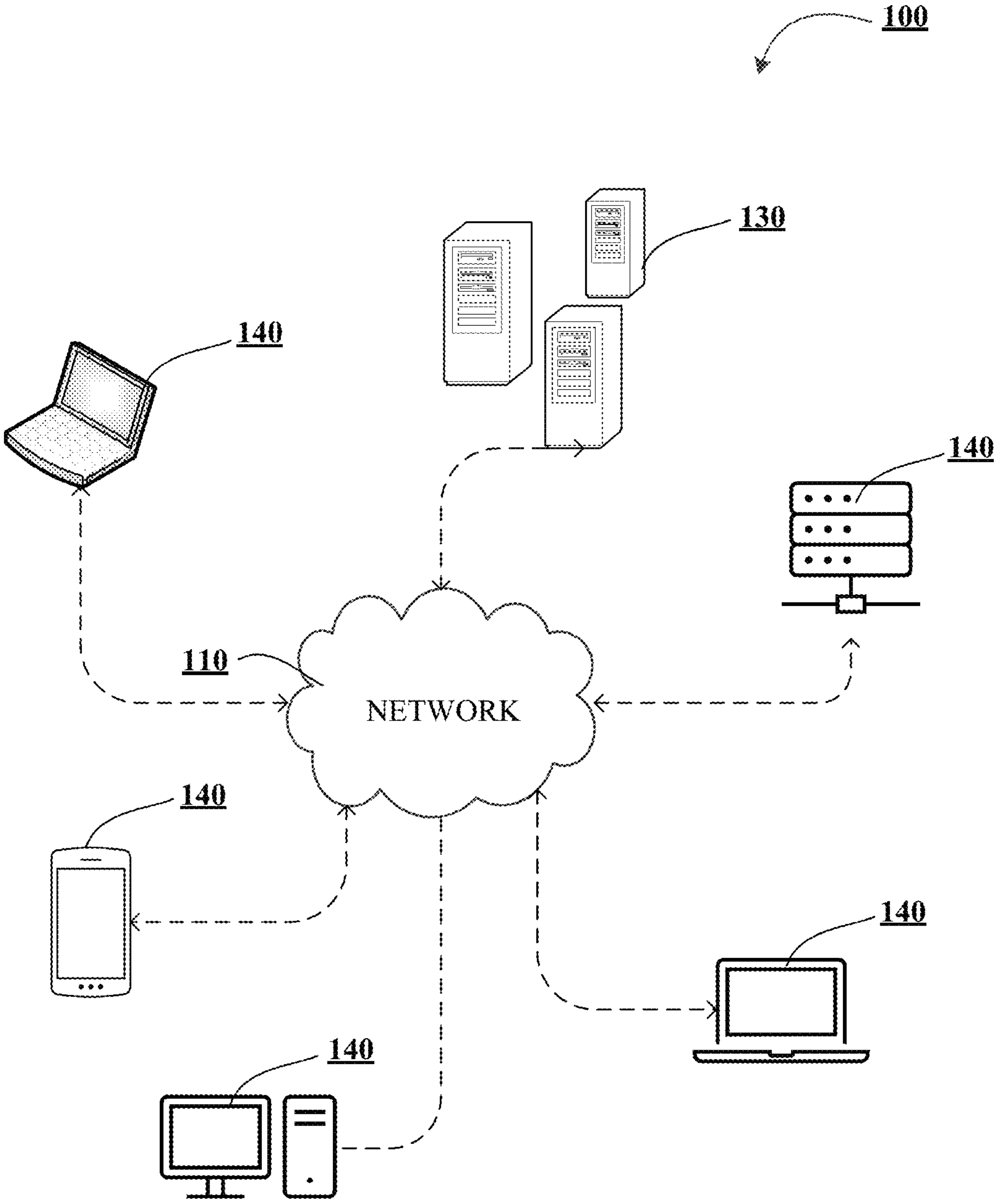
Figure 1B:
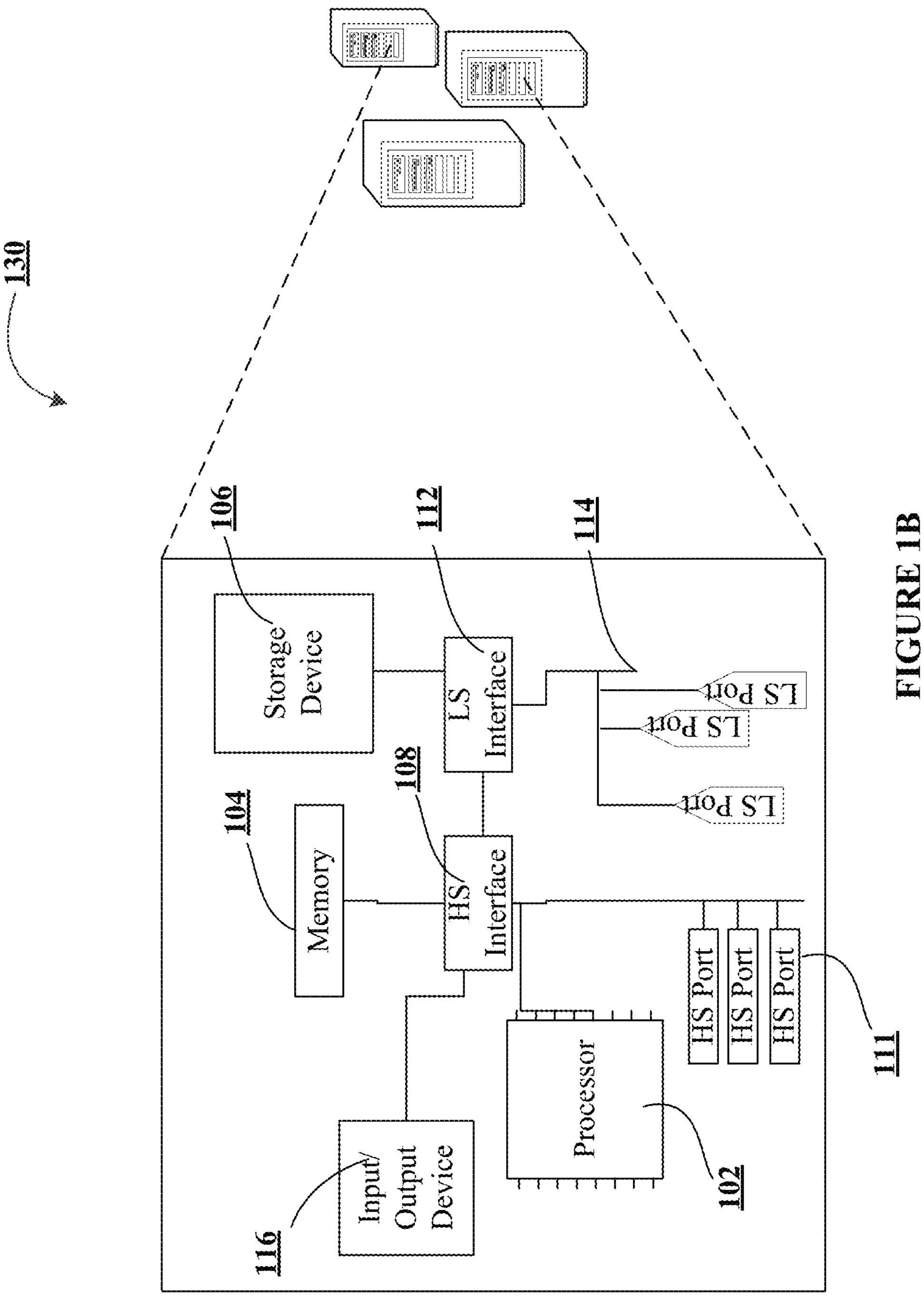
Figure 1C:
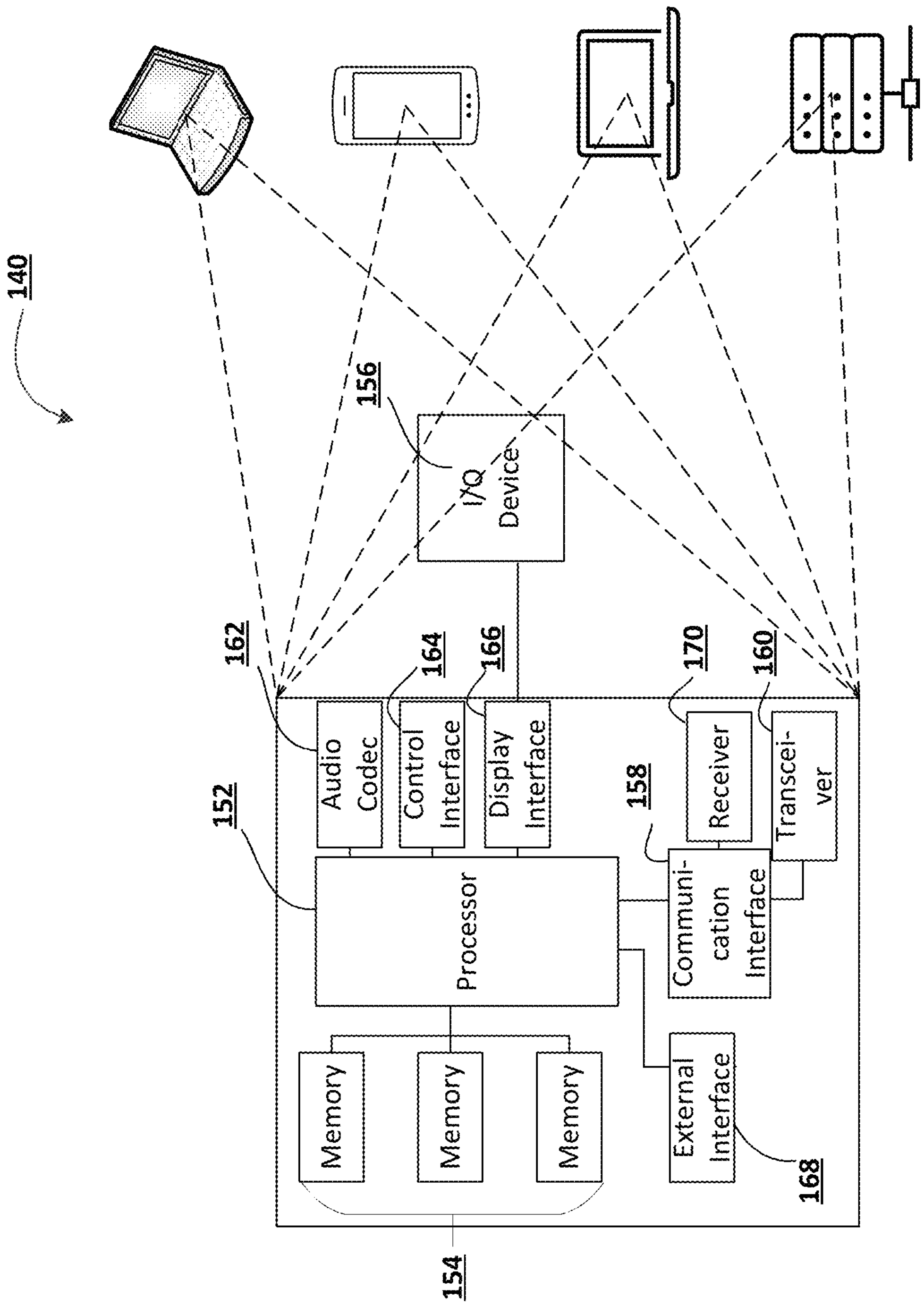
Figure 2:
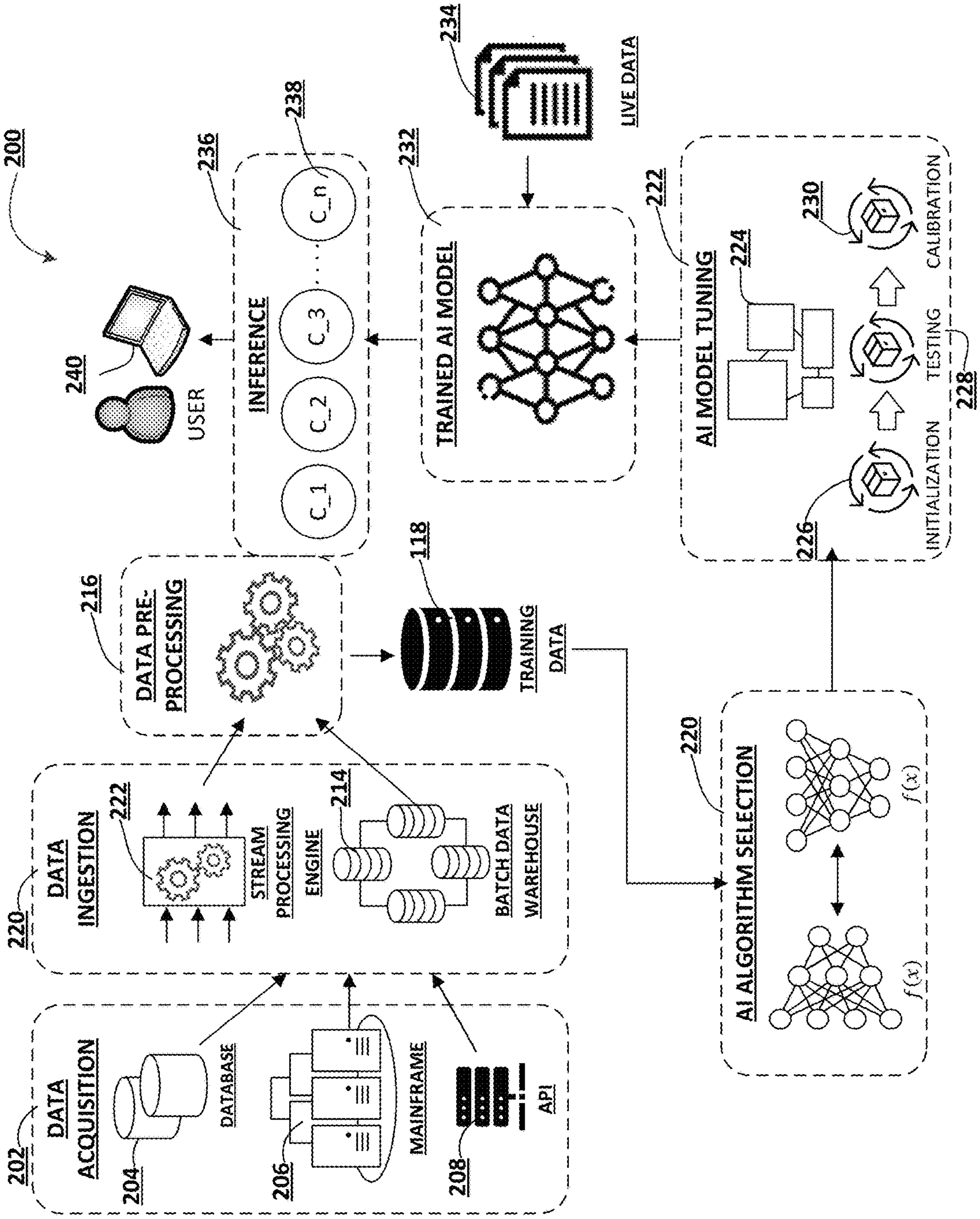
Figure 3:
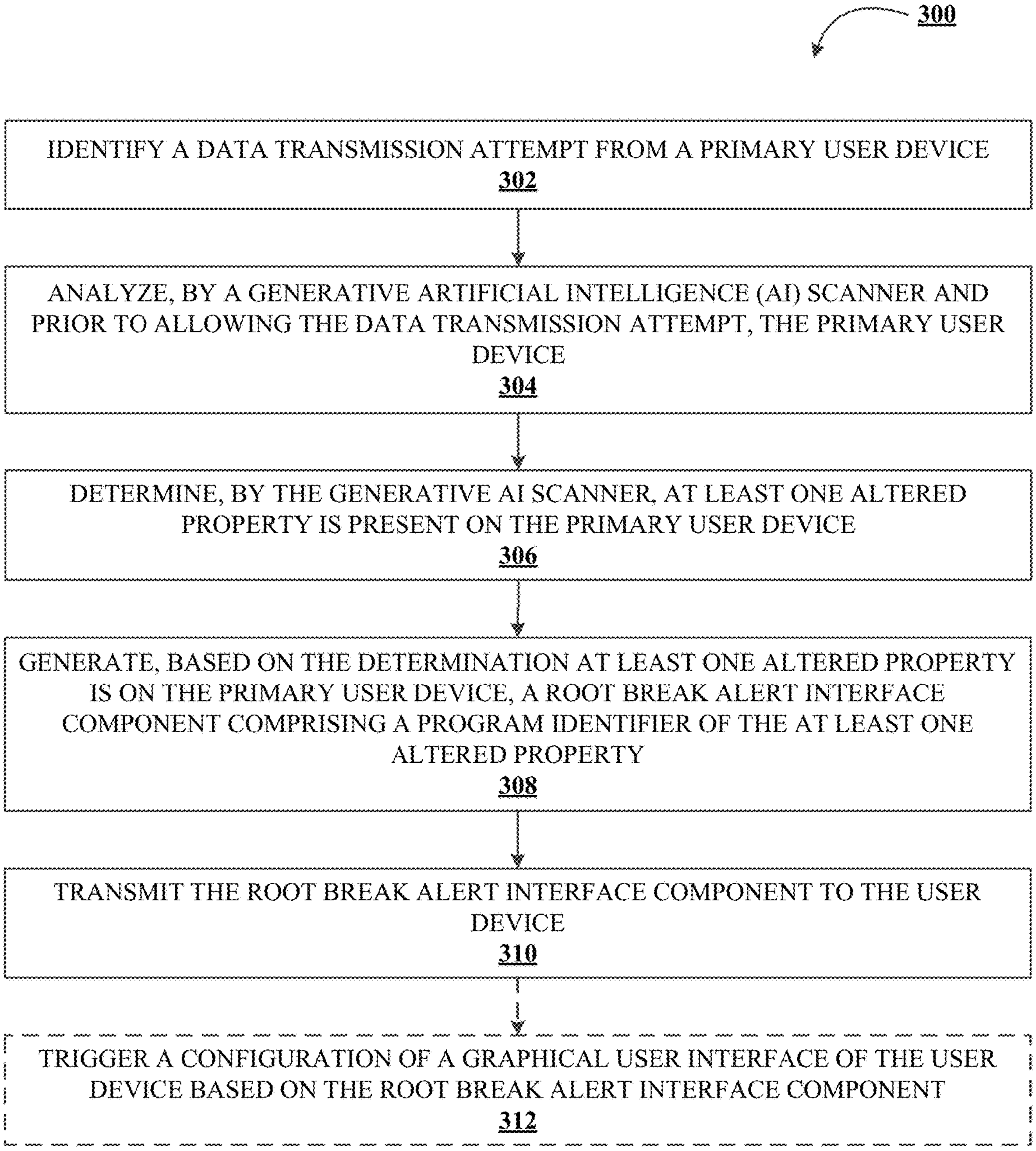
Figure 4:
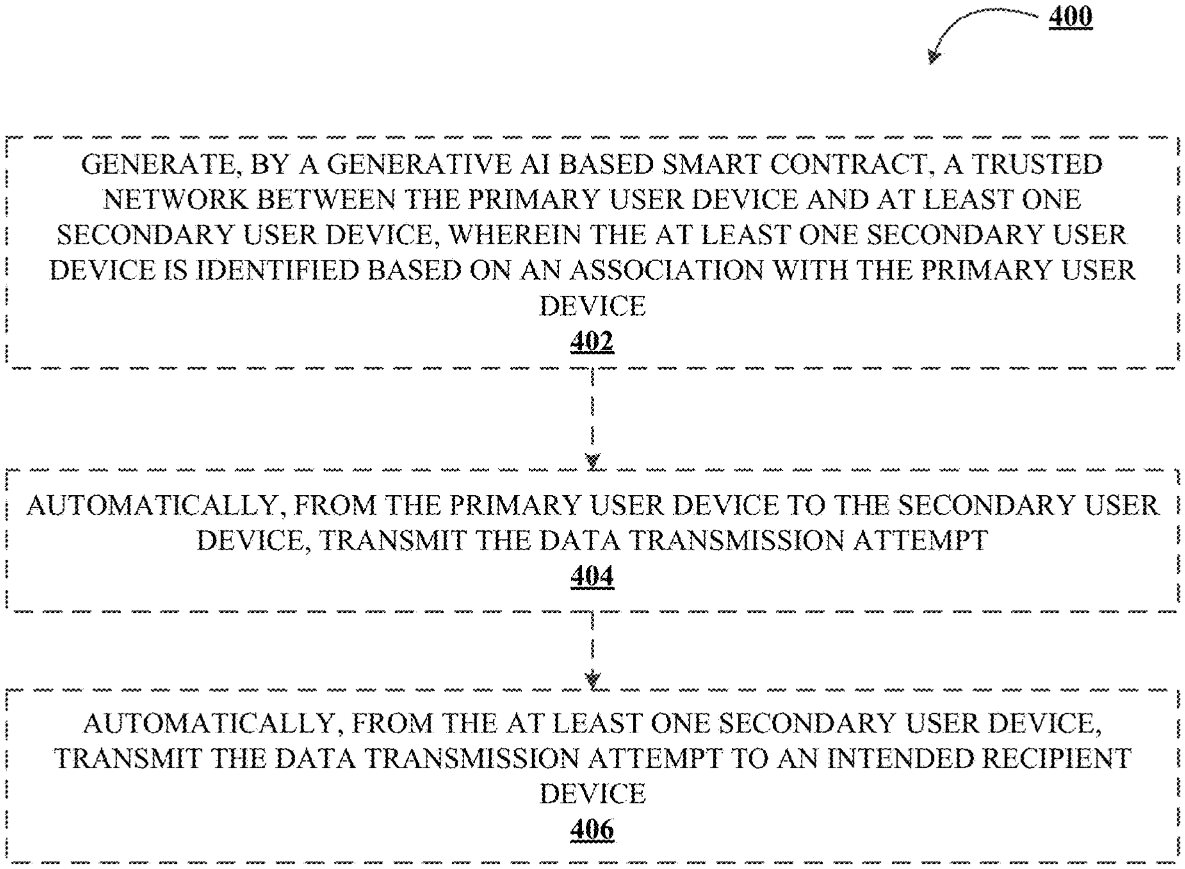
Figure 5:
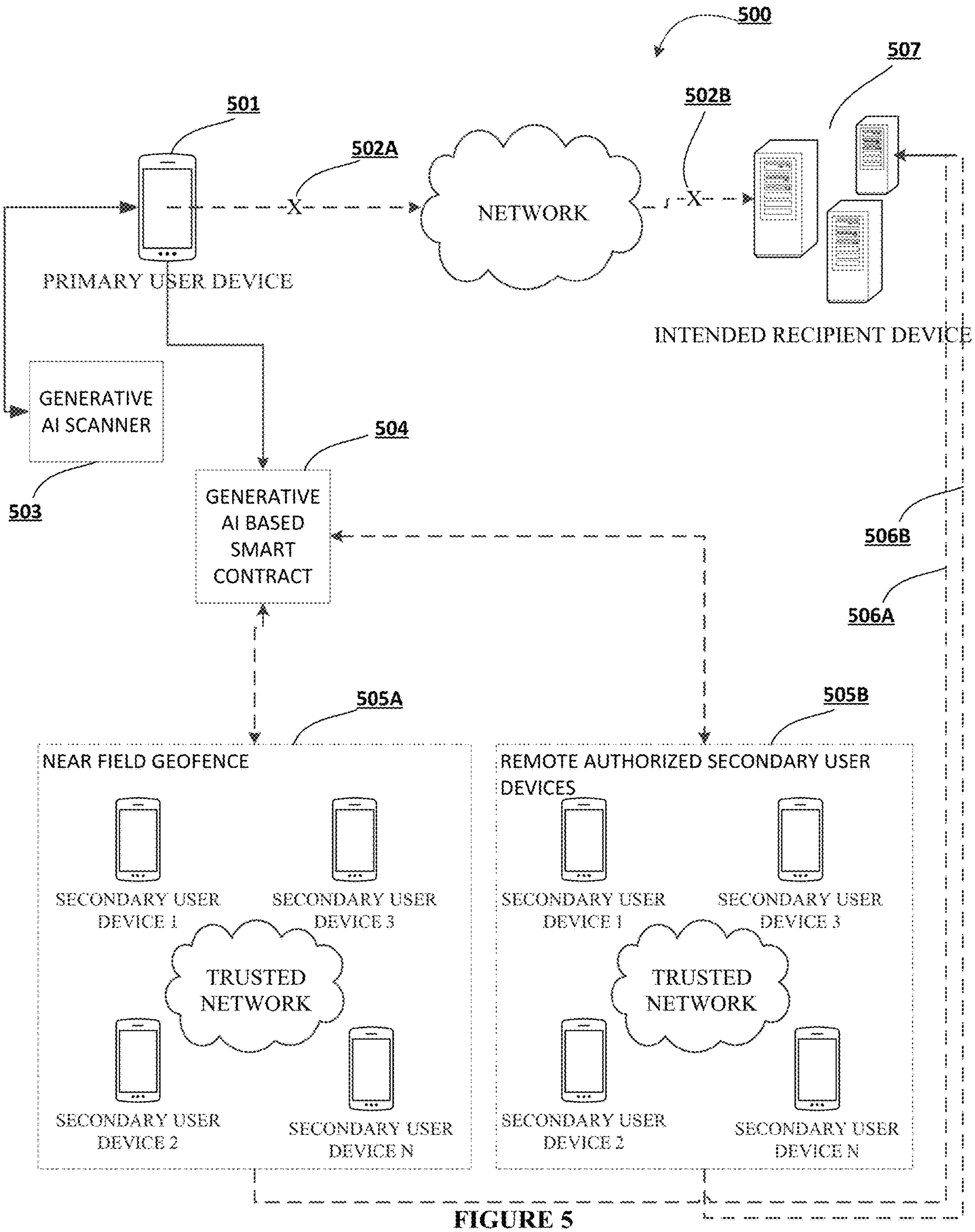

Having thus described embodiments of the invention in general terms, reference will now be made the accompanying drawings, wherein:

FIGS. 1A-1C illustrates technical components of an exemplary distributed computing environment for dynamically generating trusted networks for electronic devices, in accordance with an embodiment of the disclosure;

FIG. 2 illustrates an exemplary artificial intelligence (AI) engine subsystem architecture, in accordance with an embodiment of the disclosure;

FIG. 3 illustrates a process flow for dynamically generating trusted networks for electronic devices, in accordance with an embodiment of the disclosure;

FIG. 4 illustrates a process flow for generating a trusted network between the primary user device and the secondary user device(s) using a generative AI based smart contract, in accordance with an embodiment of the disclosure; and FIG. 5 illustrates a technical component flow diagram for dynamically generating trusted networks for electronic devices, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource transmission," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Issues often arise in electronic user devices when applications and programs are installed which are unsupported by the manufacturer of these devices. The user devices that have these installed unsupported applications and programs are often referred to as jailbroken devices or root broken devices and can cause multiple issues with the jailbroken devices. Such issues are shown when manufacturer-supported applications cannot function properly as the unsupported programs interrupt the normal functioning of these user devices. Further issues arise when secure data is attempted to be transmitted from these jailbroken devices and the data transmission cannot be completed, which may leave the secure data transmission open for data compromise, data loss, and other such data misappropriation. Thus, there exists a need for a system that can automatically, dynamically, and securely generate trusted networks for electronic devices by generated trusted networks between the jailbroken devices and trusted secondary devices that may act as a proxy for the data transmission.

Accordingly, the present disclosure provides for the identification of a data transmission attempt from a primary user device; an analysis, by a generative artificial intelligent (AI) scanner and prior to allowing the data transmission attempt, of the primary user device; a determination, by the generative AI scanner, of at least one altered property is present on the primary user device; a generation, based on the determination at least one altered property is on the primary user device, of a root break alert interface component comprising a program identifier of the at least one altered property; and a transmission of the root break alert interface component to the user device. Further, and in some embodiments, the disclosure provides for a generation, by a generative AI based smart contract, of a trusted network between the primary user device and at least one secondary user device, wherein the at least one secondary user device is identified based on an association with the primary user device. Additionally, and in some such embodiments, the disclosure may provide for an automatic, from the primary user device to the secondary user device, transmission of the data transmission attempt; and an automatic, from the at least one secondary user device, transmission of the data transmission attempt to an intended recipient device.

In other words, the disclosure provides a system for detecting whether a user device has been jailbroken, altered, or compromised based on a generative AI scanner scanning for vulnerabilities and jailbroken/altered properties, an authentication module for authenticating secondary user devices that can send data transmissions on behalf of the user device that is jailbroken or vulnerable (such as by authenticating remote trusted devices and/or authenticating trusted network within a geofence). Further, the invention provides for automatically transmitting the data transmission based on triggering a smart contract to generate a trusted network in real time. Such a trusted network may comprise user device(s) within the geofence and/or user devices located remotely from the vulnerable primary user device that have previously been identified as trustworthy by the authentication module.

What is more, the present invention provides a technical solution to a technical problem. As described herein, the technical problem includes the building of trusted networks between user devices dynamically and automatically for jailbroken or root broken devices to complete data transmissions without interruptions to normal functionality of the jailbroken or root broken devices. The technical solution presented herein allows for the automatic, dynamic, and secure generation of trusted networks for electronic devices by generating trusted networks between the jailbroken devices and trusted secondary devices that may act as secure proxies for the data transmissions. In particular, the disclosure provided herein is an improvement over existing solutions to the building of trusted networks between devices for secure data transmissions, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamically generating trusted networks for electronic devices 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth®, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary generative artificial intelligence (AI) engine subsystem architecture 200, in accordance with an embodiment of the disclosure. The generative artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2

. . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for dynamically generating trusted networks for electronic devices, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, a generative artificial intelligence engine (e.g., such as the generative AI engine shown in FIG. 2) may perform some or all of the steps described in process flow 300.

As shown in block 302, the process flow 300 may include the step of identifying a data transmission attempt from a primary user device. For instance, and as used herein, the term "data transmission attempt" refers to a data transmission request, an attempt to transmit data between a user device (e.g., a primary user device) and an intended recipient device (e.g., a processing device associated with an entity such as a data center, a secondary user device, and/or the like). By way of non-limiting example, a data transmission attempt may comprise a resource transmission attempt, which a user is attempt to transmit via their primary user device (such as through a manufacturer supported application), but may not be able to complete due to other unsupported applications interfering in the proper function of the supported application. For example, the unsupported application may be interfering with network communications between the primary user device supported application and/or the communication from the network to the intended recipient device which may be unable to read or process the data of the data transmission attempt. For example, and in some such embodiments, the intended recipient device may not be able to process such a data transmission attempt from the jailbroken device if the data of the data transmission attempt has been altered or changed in any manner based on the unsupported application's interference. Additionally, and as used herein, the primary user device refers to the user device associated with the initial generation of the data transmission attempt, whereby the initial intention may be to transmit the data transmission attempt from the primary user device to the intended recipient device.

Additionally, and in some embodiments, the system may identify such a data transmission attempt by identifying particular key strokes, events, and/or the like, as a user interacts with their primary user device (such as the particular sequence of opening an application typically used for data transmission attempts, selecting a resource account typically used for data transmission attempts, and selecting of numerical keys for inputting a resource transmission amount). In some embodiments, the system may additionally identify the data transmission attempt by identifying the opening and/or accessing of particular applications on the primary user device that are typically used for generating data transmission attempts. At an instance where such an application is opened, the system may automatically trigger the process described hereinbelow to determine whether any altered properties are present on the primary user device. In this manner, the system may be proactive in this process, such that an interruption to the data transmission is avoided and the user of the primary user device is notified before the data transmission attempt is generated and submitted (such as by configuring the primary user device's graphical user interface with an indication of the altered property).

In some embodiments, the process described herein may occur before a data transmission attempt is identified, generated, and/or the like, such that the process described herein may be pro-active in its determination of altered property (ies) on the primary user device. Additionally, and/or alternatively, the process described herein may occur after the data transmission attempt has been identified (which may occur before the data transmission attempt has been submitted for transmission to the intended recipient device, after the data transmission attempt has been submitted for transmission, and/or the like), such that the process described herein is triggered to occur right once the data transmission attempt is identified. In some such embodiments, the data transmission attempt may be stalled or halted until the analysis to determine whether an altered property is present on the primary user device and until the primary user device has been determined as not comprising any altered properties (e.g., is not jailbroken, root broken, and/or the like). In this manner, the system may prevent the potential compromise of the data within the data transmission attempt, the potential interference by a bad actor, the potential interruption to the primary user device's functioning, and/or the like.

As shown in block 304, the process flow 300 may include the step of analyzing, by a generative artificial intelligent (AI) scanner and prior to allowing the data transmission attempt, the primary user device. For instance, the system may use a generative AI scanner, which is configured to scan the primary user device (and in some instances, the secondary user devices that are used to generate the trusted network with the primary user device) for altered properties that are different than the manufacturer's supported applications, programs, data, and/or the like.

Additionally, and in some embodiments, the generative AI scanner may be trained to recognize patterns in root broken devices or jailbroken devices, whereby the training may comprise continuous and iterative processing on the training data and on the outputs generated by the generative AI scanner as it interacts in the process described herein. Further, the generative AI scanner may refine its training by adjusting the generative AI scanner's parameters as the outputs are assessed and feedback is received for each output, and finetuning the generative AI scanner to achieve the desired or correct output. In some such embodiments, the feedback received by the generative AI scanner may be based on an interaction by the user of the primary user device with the GUI of the user device to select a selectable icon indicating whether the primary user device is jail broken or root broken.

Thus, the generative AI scanner may analyze the primary user device to determine whether at least one altered property is present on the primary user device. As used herein, the altered property refers to a property (such as a piece of data, a program, an application, and/or the like) that is unsupported by the manufacturer of the user device. Thus, and where at least one altered property is present on the user device, the system may determine that the user device has been jail broken or root broken. As used herein, the terms "jail broken" and "root broken" may be used interchangeably to refer to a user device's unauthorized access to the operating system by modifying the root access for the user device (which may have been done by the user of the user device, an authorized user of the user device, and/or the like). In some embodiments, the term "root broken" may further refer to the unauthorized access to the operating system in an Android® device. In some embodiments, the term "jail broken" may refer to the unauthorized access to the operating system in an iPhone® device. However, and as understood by a person of skill in the user devices referred to herein are not limited to mobile devices, but additionally may comprise tablets, laptop devices, desktop devices, point of sale devices, automated teller machines (ATMs), and/or the like.

As shown in block 306, the process flow 300 may include the step of determining, by the generative AI scanner, at least one altered property is present on the primary user device. For example, and in some embodiments, the generative AI scanner may be trained to look for particular data stored in the primary user device, such as but not limited to a "Device Status" or "Phone Status" which may comprise an indication of "Custom" if the user device is jailbroken or root broken. In some embodiments, the generative AI scanner may be trained to look for the presence of the manufacturer software restrictions, where in an instance where these expected manufacturer software restrictions are removed, the generative AI scanner may determine that the user device has been jail broken or root broken. In some embodiments, the generative AI scanner may be configured to check for the existence of particular files or directories which would not be present on non-rooted or non-jailbroken devices. In some embodiments, the generative AI scanner may be trained with to look for each of these pieces of data on the primary user device(s) (and/or secondary user devices), such that the generative AI scanner can check each of these features on the primary user device for an accurate determination of the primary user device's jailbroken or root broken nature (e.g., check for all of these features). Alternatively, and in some embodiments, the generative AI scanner may check for only one of these features in making its determination for whether the user device has been jail broken or root broken. In some embodiments, the generative AI scanner may be trained on with currently used unsupported applications or programs that have been used in the past in jail broken or root broken devices, whereby the generative AI scanner may be trained with such data and information and may be trained to compare the applications and programs currently installed on the primary user device with these pre-identified unsupported applications and programs. In an instance where the primary user device has a program or application that matches one of these pre-identified unsupported applications or programs, then the generative AI scanner may determine that the primary user device has been jail broken or root broken.

As shown in block 308, the process flow 300 may include the step of generating, based on the determination at least one altered property is on the primary user device, a root break alert interface component comprising a program identifier of the at least one altered property. For instance, and in some embodiments, the generation of the root break alert interface components comprises a data packet of data which may be rendered in a human-readable format and which indicates that the user device has been jail broken, root broken, and/or the like. In some embodiments, the root break alert interface component comprises an indication that to complete any data transmission attempt on any manufacturer supported applications or programs, the unsupported applications or programs installed on the user device must be removed.

In some embodiments, the root break alert interface component may indicate to a user of the user device, by configuring a graphical user interface (GUI) of the user device (such as the primary user device which may be used to indicate to the primary user), that an alternate method of completing the data transmission attempt will need to occur, such as the process described herein with respect to FIGS. 4 and 5. In some such embodiments, the configured GUI may comprise a selectable icon (such as a selectable button) the user of the primary user device may "click," or "select" which asks for permission for the processes described herein below of using a secondary user device as a proxy for transmitting the data transmission attempt. Thus, and in such embodiments, the root break alert interface component comprises a packet of data which may be used to render or configure the GUI of the receiving device of the root break alert interface component once it is received by the user device.

As shown in block 310, the process flow 300 may include the step of transmitting the root break alert interface component to the user device. For example, as described briefly above, the system may transmit the root break alert interface component to a user device (such as the primary user device), when may cause a trigger of the user device to configure the GUI of the user device with the data of the root break alert interface component.

In some embodiments, and as shown in block 312, the process flow 300 may include the step of triggering a configuration of a graphical user interface (GUI) of the user device based on the root break alert interface component. Thus, and in some embodiments, the root break alert interface component rendered on the user device may further comprise at least one selectable icon for the user to "click" or "select" which may comprise a trigger for the system, once the system has received the data of the selectable icon input, to continue with the processes described herein. For instance, at least one selectable icon may comprise a request for the user to select whether they would like to use a near field geofence of secondary user device(s) to act as a proxy for transmitting the data transmission attempt, a remote geofence of secondary user device(s) to act as a proxy for transmitting the data transmission attempt, to remove the unsupported application/program(s) and continue with the data transmission attempt on the primary user device, to halt the data transmission attempt, and/or the like.

FIG. 4 illustrates a process flow 400 for generating a trusted network between the primary user device and the secondary user device(s) using a generative AI based smart contract, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, a generative artificial intelligence engine (e.g., such as the generative AI engine shown in FIG. 2) may perform some or all of the steps described in process flow 400.

In some embodiments, and as shown in block 402, the process flow 400 may include the step of generating, by a generative AI based smart contract, a trusted network between the primary user device and at least one secondary user device, wherein the at least one secondary user device is identified based on an association with the primary user device. For example, and in some embodiments, the system may generate a trusted network between the primary user device and at least one secondary user device, which is determined to be trusted for transmitting data on behalf of the primary user device. Thus, and as used herein, the trusted network may comprise a network of devices that are trustworthy to at least one user device (e.g., the primary user device).

In some embodiments, such a trusted network may comprise a primary user device and one or more secondary user devices that are located in a same general area as the primary user device (such as the same address within the same city, the same block of buildings within the same city, and/or the like) such that the primary user device and the at least one secondary user device(s) are located within the same geofence around a physical location. In other words, the association between the at least one secondary user device and the primary user device may comprise a near field geofence between the primary user device and the at least one secondary user device. By way of non-limiting example, the at least one secondary user device selected for the trusted network with the user device may be located at a same merchant as the primary user device, a same home address as the primary user device, a same business address as the primary user device, and/or the like, which may be used by the system to select one or more secondary user devices that should be trusted with the primary user device.

Additionally, and in some embodiments, the near field geofence may be based on at least one of short-range wireless communication technology, a Near Field Communication (NFC), or Radio Frequency Identification (RFID). Thus, and in some such embodiments, the primary user device may be configured with Bluetooth technology (e.g., short-range wireless communication) which can wirelessly communicate between the primary user devices and those secondary user devices that are nearby (which may comprise those that may be trusted and/or not trusted). In some embodiments, the primary user device may be configured with NFC technology to determine nearby user devices that may be analyzed as trustworthy or untrustworthy to generate the trusted network. Lastly, and in some embodiments, the primary user device may comprise an RFID tag which communicates with other similar secondary user devices with RFID tags and technology to communicate between the system on the primary user device and the secondary user device(s).

In some embodiments, the trusted network may comprise the primary user device and one or more remote secondary user devices. In some embodiments, the system may first analyze whether any of the secondary user devices co-located in the near field geofence with the primary user device can be trusted, and in an instance where none of these secondary user device can be trusted, the system may analyze remote secondary user devices to generate the trusted network with the primary user device. In some embodiments, the system may analyze the secondary user devices co-located with the primary user devices and the remote one or more secondary user devices and may generate a trusted network with a mixture of the remote one or more secondary user devices and the one or more co-located secondary user devices.

In some embodiments, the system may determine trustworthy secondary user devices based on analyzing the associated secondary user accounts associated with each secondary user device, and the associations between the secondary user accounts and the primary user account. For example, and in some embodiments, the primary user account may comprise a pre-selection by the user of the primary user account of trusted secondary user accounts that the primary user trusts for completing data transmission attempts. In some embodiments, the system may determine trusted secondary user accounts based on previous data transmissions between the primary user account and secondary user accounts, whereby the greater the number of data transmissions, the more trustworthy the secondary user account and their associated secondary user device may be considered. In some embodiments, and as the system collects data for historical and current data transmission attempts completed with secondary user devices, the system may—with greater accuracy and efficiency—determine the most trustworthy secondary user devices and secondary user accounts to function as proxies for the primary user device. Additionally, and in some embodiments, the pre-selection and/or determination by the system of the trustworthy secondary user devices and secondary user accounts may comprise a hierarchy of trustworthy secondary user devices, such that the system may go down the list from most trustworthy secondary user devices as it attempts to generate the trusted network (e.g., as secondary user devices are analyzed to act as proxy devices, the system may determine if the secondary user devices are available and on, if the secondary user devices are capable or are also jail broken or root broken, and/or the like).

In some embodiments, the trusted network of these remote secondary user devices may be generated within an application that has been installed on each of the primary user device and all the secondary user devices within the trusted network (such as a financial institution application, an entity's application, and/or the like). Thus, and in some embodiments, a geofence of remote devices (the primary user device may be located remote from each secondary user device within the trusted network) may be generated in real time or near real time irrespective of location for each user device in the trusted network.

In some embodiments, and as shown in block 404, the process flow 400 may include the step of automatically, from the primary user device to the secondary user device, transmitting the data transmission attempt. For instance, and in some embodiments, the system may automatically transmit the data transmission attempt to a chosen trusted secondary user device within the trusted network, such that the trusted secondary user device may function as a proxy between the primary user device and the intended recipient device. In some embodiments, and to protect and secure the data of the data transmission attempt, the data transmission attempt may be packaged as a Non-Fungible Token (NFT). Thus, and in some such embodiments, the NFT packaged data transmission attempt will be packaged as a one-time usage token which will expire before the data can be accessed or misappropriated. For example, and in some embodiments, once the NFT is approved or declined by the network formed with the near field geofence and/or the remote authorized network the NFT may expire to protect the data stored within the NFT. For example, and in an instance where the trusted secondary user device is selected as the proxy for the primary user device, the system may generate a notification for the trusted secondary user device which requests the trusted secondary user to "accept or approve the request" to transmit the NFT. In an instance where the trusted secondary user inputs a response indicating that they do not approve, then the NFT may automatically expire and be destroyed. Alternatively, and where the trusted secondary user inputs a response indicating that they do approve, then the NFT may automatically be transmitted from the primary user device to the trusted secondary user device.

In some embodiments, the system may comprise a generative AI based smart contract which generates the NFT upon a trigger from the system indicating that a trusted secondary user device has been selected. In some embodiments, the generative AI based smart contract may further be configured to expire and/or destroy the NFT in response to receiving an indication that the request from the trusted secondary user device was denied. In such an instance, the system may continue to a new trusted secondary user device to act as a proxy and a new NFT may be generated that is particular to the new trusted secondary user device, which may likewise be expired/destroyed or forwarded depending on the response received from the new trusted secondary user device.

In some embodiments, and as shown in block 406, the process flow 400 may include the step of automatically, from the at least one secondary user device, transmitting the data transmission attempt to an intended recipient device. For example, and in some embodiments, the system may automatically cause the data transmission attempt to an intended recipient device from the trusted secondary user device. Additionally, and in some embodiments, the data transmission attempt transmitted from the at least one secondary user device to the intended recipient device may comprise a Non-Fungible Token (NFT), which may be the same NFT as that described hereinabove from the primary user device to the trusted secondary user device.

Additionally, and importantly, upon completing the data transmission attempt with the NFT, the NFT cannot be re-used by the trusted secondary user device or any other actor. For instance, the NFT described herein may be built on top of block chain technology which is immutable and not accessible for modification by any other actor as the NFT is encrypted. Such data may be protected even when a hacker has access to the primary user device or the trusted secondary user device that acted as a proxy device.

FIG. 5 illustrates a technical component flow diagram 500 for dynamically generating trusted networks for electronic devices, in accordance with an embodiment of the disclosure. In some embodiments, a system (e.g., similar to one or more of the systems described herein with respect to FIGS. 1A-1C) may perform one or more of the steps of technical component flow diagram 500. For example, a system (e.g., the system 130 described herein with respect to FIG. 1A-1C) may perform the steps of technical component flow diagram 500. In some embodiments, a generative artificial intelligence engine (e.g., such as the generative AI engine shown in FIG. 2) may perform some or all of the steps described in technical component flow diagram 500.

As shown in technical component flow diagram 500, and in some embodiments, the process may start with a primary user device 501 attempt to submit a data transmission attempt via a network and an interruption 502A occurring between the primary user device's communication with the network and/or an interruption 502B occurring between the network and the intended recipient device 507. Based on at least one interruption for the data transmission attempt, the process may continue to a generative AI scanner 503 to determine whether the primary user device comprises at least one altered property. In some embodiments, the process may start by the generative AI scanner 503 determining whether the primary user device comprises at least one altered property, such that the process described herein may occur in a pro-active or pre-emptive manner before a data transmission attempt has been generated or submitted.

Further, and upon determining that the primary user devices comprises an altered property, the system may continue to a generative AI based smart contract 504, which may determining the trusted secondary user devices to choose from in generating a trusted network for the primary user device, generate the trusted network, and generate an NFT for transmitting the data transmission attempt securely to the selected trusted secondary user device. Thus, and in some embodiments, the generative AI based smart contract may select a near field geofence 505A of trusted secondary user device(s), wherein at least one of the trusted secondary user devices may act as a proxy for the primary user device. Additionally, and/or alternatively, the generative AI based smart contract 504 may select trusted secondary user devices that are remote from the primary user device to generate a trusted network of remote authorized secondary user devices. Upon generating the NFT, and receiving an indication that the selected trusted secondary device of the trusted network accepts to transmit the data transmission attempt, then system may cause the NFT to be transmitted to the intended recipient device 506A or 506B.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically generating trusted networks for electronic devices, the system comprising:

a memory device with computer-readable program code stored thereon;

at least one processing device operatively coupled to the at least one memory device and the at least one communication device, wherein executing the computer-readable code is configured to cause the at least one processing device to:

identify a data transmission attempt from a primary user device to an intended recipient;

analyze, by a generative artificial intelligent (AI) scanner and prior to allowing the data transmission attempt, the primary user device to detect whether the primary user device is a jailbroken device or a root broken device based on scanning for unsupported applications or programs installed on the primary user device that are unsupported by a manufacturer of the primary user device;

determine, by the generative AI scanner based on the detection that the primary user device is a jailbroken device or a root broken device, at least one altered property is present on the primary user device;

generate, based on the determination that the at least one altered property is present on the primary user device, a root break alert interface component comprising a program identifier of the at least one altered property;

transmit the root break alert interface component to the user device; and generate, in response to the determination that the at least one altered property is present on the primary user device, by a generative AI based smart contract, a trusted network between the primary user device and at least one secondary user device, wherein the at least one secondary user device is identified based on an association with the primary user device and is configured to act as a proxy that automatically transmits the data transmission to the intended recipient on behalf of the primary user device, and wherein the association between the at least one secondary user device and the primary user device comprises a pre-selection by a user account associated with the primary user device of an at least one secondary account associated with the at least one secondary user device.

2. The system of claim 1, wherein executing the computer-readable code is further configured to cause the at least one processing device to:

trigger a configuration of a graphical user interface of the user device based on the root break alert interface component.

3. The system of claim 1, wherein executing the computer-readable code is further configured to cause the at least one processing device to:

automatically, from the primary user device to the secondary user device, transmit the data transmission attempt.

4. The system of claim 3, wherein the data transmission attempt transmitted from the primary user device is a Non-Fungible Token (NFT).

5. The system of claim 3, wherein the data transmission attempt transmitted from the at least one secondary user device to the intended recipient device is a Non-Fungible Token (NFT).

6. The system of claim 1, wherein the association between the at least one secondary user device and the primary user device comprises a near field geofence between the primary user device and the at least one secondary user device.

7. The system of claim 6, wherein the near field geofence is based on at least one of short-range wireless communication, a Near Field Communication (NFC), or Radio Frequency Identification (RFID).

8. The system of claim 1, wherein the at least one secondary user device is located remote from the primary user device.

9. A computer program product for dynamically generating trusted networks for electronic devices, the computer program product comprising a non-transitory computer-readable medium comprising code causing an apparatus to:

identify a data transmission attempt from a primary user device to an intended recipient;

analyze, by a generative artificial intelligent (AI) scanner and prior to allowing the data transmission attempt, the primary user device to detect whether the primary user device is a jailbroken device or a root broken device based on scanning for unsupported applications or programs installed on the primary user device that are unsupported by a manufacturer of the primary user device;

determine, by the generative AI scanner based on the detection that the primary user device is a jailbroken device or a root broken device, at least one altered property is present on the primary user device;

generate, based on the determination that the at least one altered property is present on the primary user device, a root break alert interface component comprising a program identifier of the at least one altered property;

transmit the root break alert interface component to the user device; and generate, in response to the determination that the at least one altered property is present on the primary user device, by a generative AI based smart contract, a trusted network between the primary user device and at least one secondary user device, wherein the at least one secondary user device is identified based on an association with the primary user device and is configured to act as a proxy that automatically transmits the data transmission to the intended recipient on behalf of the primary user device, and wherein the association between the at least one secondary user device and the primary user device comprises a pre-selection by a user account associated with the primary user device of an at least one secondary account associated with the at least one secondary user device.

10. The computer program product of claim 9, the computer program product further comprising non-transitory computer-readable medium comprising code causing an apparatus to:

trigger a configuration of a graphical user interface of the user device based on the root break alert interface component.

11. The computer program product of claim 9, the computer program product further comprising non-transitory computer-readable medium comprising code causing an apparatus to:

automatically, from the primary user device to the secondary user device, transmit the data transmission attempt.

12. The computer program product of claim 11, wherein the data transmission attempt transmitted from the primary user device is a Non-Fungible Token (NFT).

13. The computer program product of claim 11, wherein the at least one secondary user device is located remote from the primary user device.

14. A computer implemented method for dynamically generating trusted networks for electronic devices, the computer implemented method comprising:

identifying a data transmission attempt from a primary user device to an intended recipient;

analyzing, by a generative artificial intelligent (AI) scanner and prior to allowing the data transmission attempt, the primary user device to detect whether the primary user device is a jailbroken device or a root broken device based on scanning for unsupported applications or programs installed on the primary user device that are unsupported by a manufacturer of the primary user device;

determining, by the generative AI scanner based on the detection that the primary user device is a jailbroken device or a root broken device, at least one altered property is present on the primary user device;

generating, based on the determination that the at least one altered property is present on the primary user device, a root break alert interface component comprising a program identifier of the at least one altered property;

transmitting the root break alert interface component to the user device; and generating, in response to the determination that the at least one altered property is present on the primary user device, by a generative AI based smart contract, a trusted network between the primary user device and at least one secondary user device, wherein the at least one secondary user device is identified based on an association with the primary user device and is configured to act as a proxy that automatically transmits the data transmission to the intended recipient on behalf of the primary user device, and wherein the association between the at least one secondary user device and the primary user device comprises a pre-selection by a user account associated with the primary user device of an at least one secondary account associated with the at least one secondary user device.

15. The computer implemented method of claim 14, further comprising: triggering a configuration of a graphical user interface of the user device based on the root break alert interface component.

16. The computer implemented method of claim 14, further comprising:

automatically, from the primary user device to the secondary user device, transmitting the data transmission attempt.

* * * * *